United States Patent [19]

Tokunaga et al.

[11] Patent Number: 4,763,312

[45] Date of Patent: Aug. 9, 1988

[54] BONDING STRUCTURE FOR TIMEPIECES

[75] Inventors: Ikuo Tokunaga; Shigemi Sasaki, both of Suwa, Japan

[73] Assignee: Seiko Epson Corporation, Tokyo, Japan

[21] Appl. No.: 132,247

[22] Filed: Dec. 14, 1987

[30] Foreign Application Priority Data

Dec. 15, 1986 [JP] Japan .................................. 61-297901
Sep. 24, 1987 [JP] Japan .................................. 62-239646

[51] Int. Cl.$^4$ .................................................. G04B 37/00
[52] U.S. Cl. ........................................... 368/280; 522/6
[58] Field of Search ..................... 368/676, 280; 522/6, 522/7, 8, 34, 36, 44, 46, 103; 525/920, 922

[56] References Cited

U.S. PATENT DOCUMENTS

| | | | |
|---|---|---|---|
| 4,065,587 | 12/1977 | Ting ........................................ | 522/44 |
| 4,559,371 | 12/1985 | Husler et al. ......................... | 522/14 |
| 4,703,338 | 10/1987 | Sagami et al. ........................ | 522/103 |

*Primary Examiner*—Vit W. Miska

*Attorney, Agent, or Firm*—Blum Kaplan

[57] ABSTRACT

A bonding structure of a timepiece case such as the glass, bezel, case band, pipe, core and case back. Seams bonded with the bonding agent are both durable and waterproof. The bonding agent includes relative to:

(A) 100 parts by weight urethane (met) acrylate having more than one acryloyl group and/or methacryloyl group per molecule;
(B) 30 to 200 parts by weight (meta) acrylate having more than one hydroxyl group per molecule;
(C) 30 to 200 parts by weight isobornyl (meta) acrylate;
(D) 30 to 200 parts by weight pre-tacky resin of the petroleum series and coal series and/or the rosin ester series which are soluble in (meta) acrylate monomer;
(E) 5 to 50 parts by weight acrylic acid and/or methacrylic acid; and
(F) 0.5 to 15 parts by weight photopolymerization initiator of benzoin or benzyldimethylketal or the like.

11 Claims, 5 Drawing Sheets

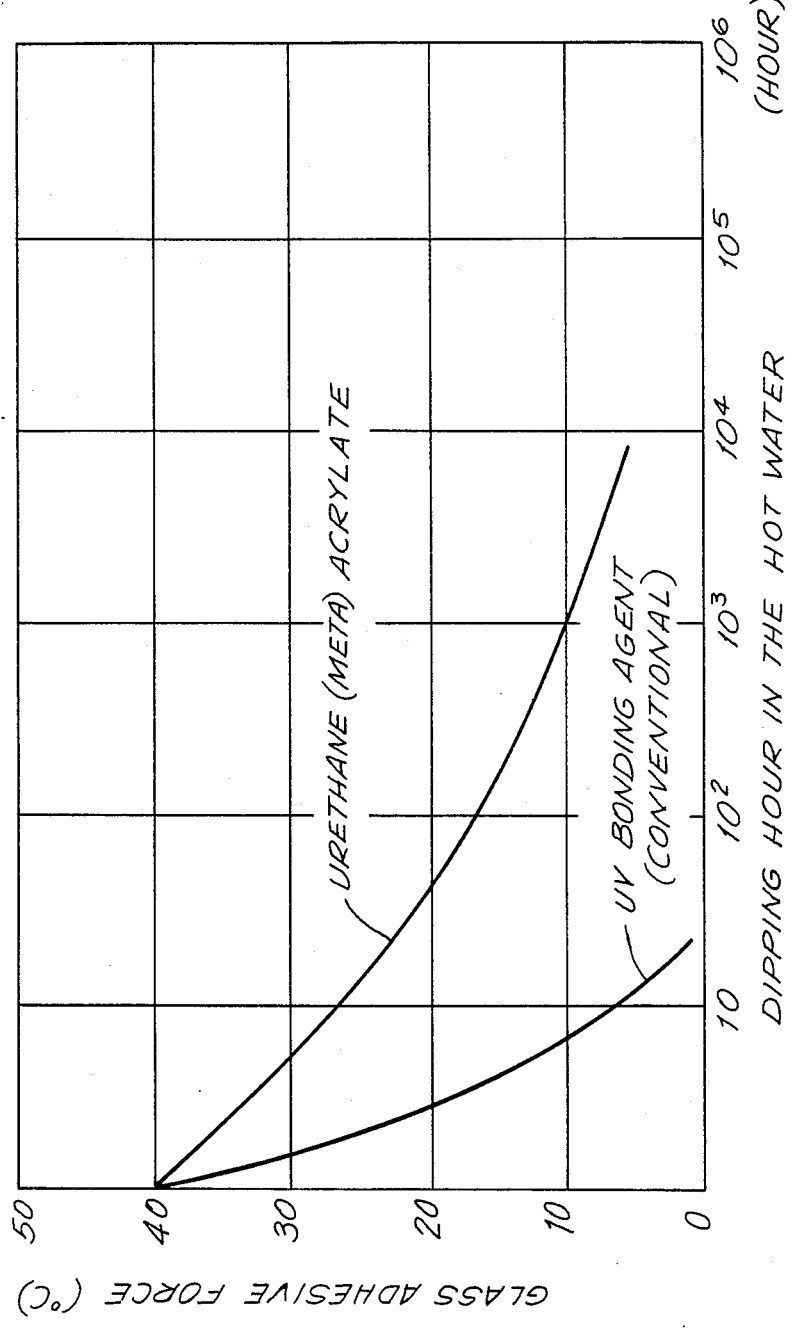

BONDING STRUCTURE FOR TIMEPIECES

BACKGROUND OF THE INVENTION

This invention relates to a bonding structure for timepieces, and in particular to a urethane (meta) acrylate series photo-stiffening bonding agent for bonding parts of a timepiece to provide a waterproof structure.

There are many conventional structures suitable for providing a waterproof timepiece. FIGS. 1 and 2 show such conventional structures in sectional view. It is desirable to miniaturize these watches and provide thin, waterproof cases. Such conventional cases generally include a synthetic resin gasket 31 as a sealing agent between a watch glass 32 and a case band 33 by inteference fit. In FIG. 2 glass bezel 38 is disposed intermediate case band 33 and glass 32 and synthetic resin gasket 31 is engaged between glass 32 and glass bezel 38. To provide a watertight seal, substantial pressure is exerted on gasket 31 by glass plate 32 and a bearing wall 45 of case band 33 or a bearing wall 41 of glass bezel 38.

Synthetic resin gasket 31 is generally formed from a fluoroethylene resin or the like. Case band 33 or glass bezel 38 must have bearing wall 45 or 41 respectively, of sufficient height to exert pressure on gasket 31. Case band 33 or glass bezel 38 must be large enough and properly shaped or they will deform from the stress generated by pressing on synthetic gasket 31. Gasket 31 must have a height B of between about 0.6 to 1.0 mm and a width A of gasket 31 must be between about 0.2 and 0.4 mm in order to provide the desired binding force and sealing properties. Since case band 33 or glass bezel 38 which hold glass 32 must be sufficiently strong to retain the needed stress of gasket 31, the height and width of case band 33 and glass bezel 38 tend to be large. This limits the extent to which a watch can be miniaturized or be made thin.

Watch cases formed using these synthetic resin gaskets have other drawbacks in addition to the limits on shape. An individual pre-formed gasket must be used for each particular timepiece case design. Thus, a great number of different sizes and shapes must be available. This interfers with both the convenience of manufacturing the cases and the ease of repair. Use of a synthetic resin gasket always requires a glass bearing wall which interfers with presenting several types of design. For example, it is difficult to provide a rectangular shape.

When a watch case is constructed with a waterproof gasket, several other components must be mounted to the case. As shown in FIGS. 1 and 2, a pipe 34 to receive a watch stem extends through watch case 33. Pipe 34 is generally fixed to case band 33 by a conventional UV bonding agent, or solder. A timepiece case back 35 and a core 36 are typically fixed by soldering. The seam between case band 33 and case back 35 is generally sealed with a water resistant packing 37. The seam between glass bezel 38 and case band 33 in FIG. 2 are generally made water-tight by including water resistant packing 39 therebetween.

Timepiece cases constructed in the above manner are deficient due to shortcomings in the conventional UV bonding agents used to bond the components of a timepiece case together. Special apparatuses are required to work with these adhesives and the adhesive force decreases with exposure to hot water as shown in FIG. 9. Further, conventional UV setting bonding agents do not provide waterproof seals.

Conventional epoxy-type bonding agents have been tried, but they also have drawbacks. They require that a chief agent and a stiffening agent be mixed. Production is delayed because substantial time must elapse before the epoxy bonding agents set. Although epoxy bonding agents can prevent moisture from damaging the timepiece, they do not provide a satisfactory waterproof seal under water pressure of 2 to 3 atmospheres. Finally, conventional epoxy-type adhesives are insufficiently resistant to heat. They are not durable enough and interfere with mass production techniques which increases the cost of manufacturing.

Accordingly, it is desirable to provide a bonding agent for a timepiece case which will overcome the fabrication, design and watrproof problems associated with the prior art case constructions.

SUMMARY OF THE INVENTION

Generally speaking, in accordance with the invention, a new bonding agent for bonding (typical parts of a timepiece case, such as the glass, bezel, case band, pipe, core and case back) is provided. The bonding agent includes relative to:

100 parts by weight urethane (meta) acrylate having more than one acryloyl group and/or methacryloyl group per molecule;

30 to 200 parts by weight (meta) acrylate having more than one hydroxyl group per molecule;

30 to 200 parts by weight isobornyl (meta) acrylate;

30 to 200 parts by weight pre-tacky resin of the petroleum series and coal series and/or the rosin ester series which are soluble in (meta) acrylate monomer;

5 to 50 parts by weight acrylic acid and/or methacrylic acid; and 0.5 to 15 parts by weight photopolymerization initiator of benzoin or benzyldimethylketal or the like.

Accordingly, it is an object of this invention to provide an improved bonding agent for a timepiece case.

Another object of the invention is to provide an improved bonding agent for a timepiece case which is water resistant.

A further object of the invention is to provide an improved bonding agent suitable to provide a timepiece case which is thin or miniaturized.

Still another object of the invention is to provide an improved bonding agent for a timepiece case which is resistant to heat.

Still a further object of the invention is to provide an improved bonding agent for a timepiece case which is both convenient to manufacture and repair.

Still other objects and advantages of the invention will in part be obvious and will in part be apparent from the specification.

The invention accordingly comprises a composition of matter possessing the characteristics, properties, and the relation of components which will be exemplified in the composition hereinafter described.

The invention further comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a graph comparing deterioration of adhesive force after hot water immersion bonding agents.

DESCRIPTION OF THE PREFERRED EMBODIMENTS

Figure 1:
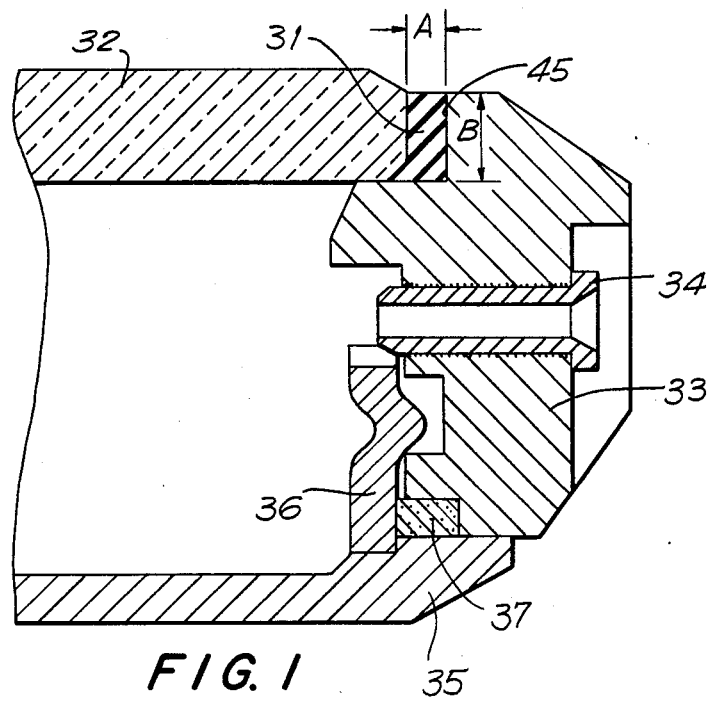
FIG. 1 is a sectional view of a prior art watch case.
Figure 2:
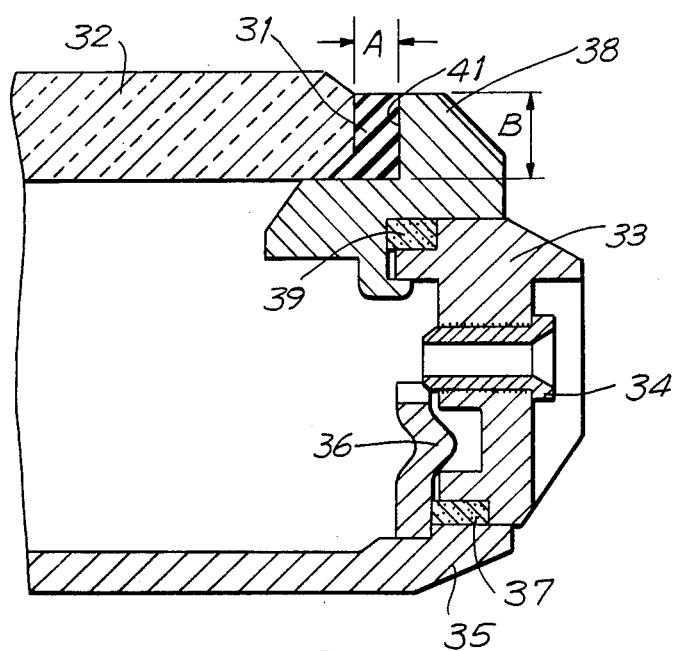
FIG. 2 is a sectional view of another embodiment of a prior art watch case.

The conventional components of a timepiece case are bonded together by the improved bonding agent in accordance with the invention. This overcomes the inadequacies presented by prior art bonding agents and synthetic resin gaskets. The bonding agent provides a waterproof seal without the bulk or other problems associated with gaskets. Accordingly, timepiece case structures utilizing this bonding agent exhibit advantages over prior art timepiece cases.

The bonding agent prepared in accordance with the invention is a urethane (meta) acrylate series photo-stiffening type, one liquid, bonding agent. It exhibits excellent water resistance, thermostiffening and anaerobic properties. The bonding agent is formed by addmixing the following components:

A. 100 parts by weight urethane (meta) acrylate having more than one acryloyl group and/or methacryloyl group per molecule;

B. 30 to 200 parts by weight (meta) acrylate having more than one hydroxyl group per molecule, such as 2-hydroxypropyl (meta) acrylate;

C. 30 to 200 parts by weight isobornyl (meta) acrylate;

D. 30 to 200 parts by weight pre-tacky resin of petroleum series, coal series and/or ester series resins which are soluble in (meta) acrylate monomer;

E. 5 to 50 parts by weight acrylic acid and/or methacrylic acid; and

F. 0.5 to 15 parts by weight photopolymerization initiator, such as benzoin or benzyldimethylketal.

The relative proportions of the components, compared to 100 parts by weight of urethane (meta) acrylate are important for imparting necessary characteristics to the bonding agent. If there is less than about 30 parts by weight (meta) acrylate having more than 1 hydroxyl group per molecule (Component B), it is difficult to polymerize and thereby stiffen the bonding agent sufficiently by irradiation. This adversely effects the adhesive properties of the bonding agent. However, if the proportion of component B exceeds about 200 parts by weight, the bonding agent will have poor water resistance due to the hydrophilic nature of component B.

The viscosity of urethane acrylate is relatively high. If there is too little isobornyl (meta) acrylate (Component C) the viscosity of the bonding agent will be too high to uniformly coat the surfaces of the timepiece case components to be bonded. A non-uniform coating creates cracks which allow water to seep into the case. However, if there is too much Component C, the bonding agent will become too hard which also leads to cracks.

If there is too little pre-tacky resin of the petroleum series and coal series and/or rosin ester series which are soluble in (meta) acrylate monomer (Component D) the resistance of the bonding agent to water decreases. However, if there is too much Component D the viscosity of the bonding agent becomes too high. It becomes weaker and cracks form therein more easily. This decreases the resistance of the bonding agent to water.

If there is too little acrylic acid and/or methacrylic acid (Component E), not enough of the acrylic acid skeleton will be available to contribute to the adhesive force of the bonding agent. However, if there is too much Component E, there will be excess acrylic acid skeleton which has unreacted polarity. This decreases the resistance of the bonding agent to water.

A photopolymerization initiator (Component F) is expensive. Accordingly, using excess amounts increases the cost of the bonding agent. However, if too little is used, the bonding agent takes too long to set, which adversely affects mass production of timepiece cases in accordance with the invention.

FIGS. 3–8 illustrate sectional views of several embodiments of watch cases constructed in accordance with the invention. Similar elements in each figure have the same reference numeral.

Figure 3:
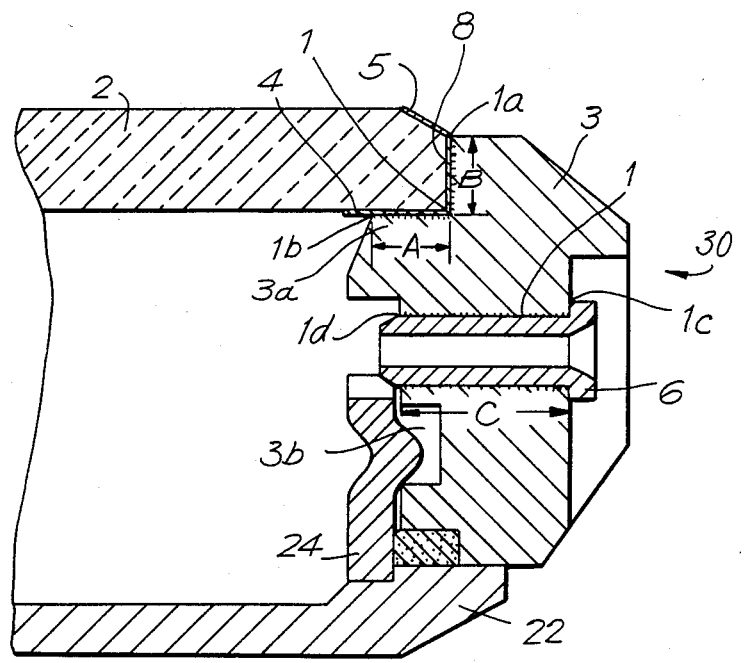
FIG. 3 is a sectional view of a watch case constructed and arranged in accordance with the invention.

Referring generally to FIG. 3 the principal components of a timepiece case 30 are shown. A watch glass 2 and a case back 22 are mounted on a watch case band 3. Glass plate 2 rests on an upper surface of a shoulder 3a formed in case band 3. Case band 3 has a bearing wall 8 which receives the vertical edge of glass 2. The horizontal and vertical edges of glass 2 are fixed along both surfaces of shoulder 3a by a bonding agent 1. A clip 24 is mounted along at the edge of case back 22 for selectively engaging an opening 3b formed in case band 3. A pipe 6 is provided through case band 3 to receive a timepiece stem.

Watch glass 2 can be an inorganic glass, such as a borosilicate glass, soda-lime glass, sapphire glass and spinel glass or the like. Case band 3 which holds glass 2 and pipe 6 is generally formed of titanium and stainless steel and may be plated with, for example, brass or nickel or a precious metal, such as silver, gold and platinum. Additional materials such as aluminum or ultra hard alloys and ceramics such as carbide, nitride, oxide and boride can be used.

Bonding agent 1 is a urethane (meta) acrylate series photo-stiffening type liquid bonding agent including as the combination of components A to F and in the proportions described above.

Bonding agent 1 is applied between opposed surfaces of glass 2 and case band 3 and extends continuously along the surfaces of shoulder 3a from position 1a to position 1b. Bonding agent 1 is also applied between opposed surfaces of case band 3 and pipe 6 continuously between position 1c and 1d. Measurement A indicates the width of the bonding agent along the horizontal surface of shoulder 3a of case band 3 and the bottom edge of glass 2. Measurement B indicates the height of bonding agent 1 between vertical bearing wall 8 of shoulder 3a of case band 3 and the edge of glass 2.

Measurement C indicates the length of bonding agent 1 disposed between the mating surfaces of pipe 6 and case band 3.

After the bonding agent is applied and the elements to be bonded are assembled, the assembly is heated preliminarily to a temperature of about 50° C. which improves the adhesive force. An appropriate range is between about 40° to 70° C. However, if the temperature is higher than 80° C., the adhesive force of the bonding agent deteriorates. Further, if the preliminary heating does not increase the case temperature above about 40° C., the adhesive force of the bonding agent is only about as great as that of a common bonding agent. Accordingly, the adhesive force is not improved by the preliminary heating.

The bonding agent is stiffened by exposure to ultraviolet radiation for several tens of seconds and then white fluorescent light for several tens of minutes. It is beneficial to place optically reflective materials such as wrapping foil or aluminum foil under the case. This promotes stiffening of the bonding agent by reflecting light from the back surface to the bonding agent.

A metalizing film or coating 4, such as gold or chrome or an adhesive bandage such as liquid-metal paint printing is applied to the bottom edge of glass 2 where it contacts bonding agent 1. A metal coat 5 is also applied to the outer top edge surface of glass 2. Metal coating 4 covers a larger area then bonding agent 1 for aesthetic purposes. Either decorative structure or a combination of both can be used to hide bonding agent from view.

In accordance with this embodiment of the invention, glass 2 and pipe 6 are fixed securely to case band 3, and at the same time the watch case is also sealed. Since this construction eliminates synthetic resin gasket 31 of FIG. 1 there is very little stress exerted against bearing wall 8 of case band 3 and the dimension of shoulder 3a in the height and planar directions can be reduced. This aids in allowing production of thinner timepiece cases. Sufficient adhesive force and sealing of the seam between glass 2 and case band 3 can be achieved if $A \geqq 0.4$ mm, and $B \geqq A$. Further, bonding agent 1 between pipe 6 and case band 3 should be, $C \geqq 0.8$ mm. If insufficient bonding agent is used, the bonding forces will be insufficient for practical use.

Bonding agent 1 has anaerobic properties. When it is sealed off from air, it sets. It also sets when it is exposed to ultraviolet and fluorescent light. When the exposed portions of bonding agent 1 along glass 2 between 1a and 1b and between pipe 6 and case 3 between 1c and 1d are irradiated and set, air is sealed off from the unexposed portions of the bonding agent whereby the entire quantity of bonding agent is set. By merely irradiating the exposed portions of the bonding agent, the entire quantity of bonding agent can be set under normal temperatures.

Figure 4:
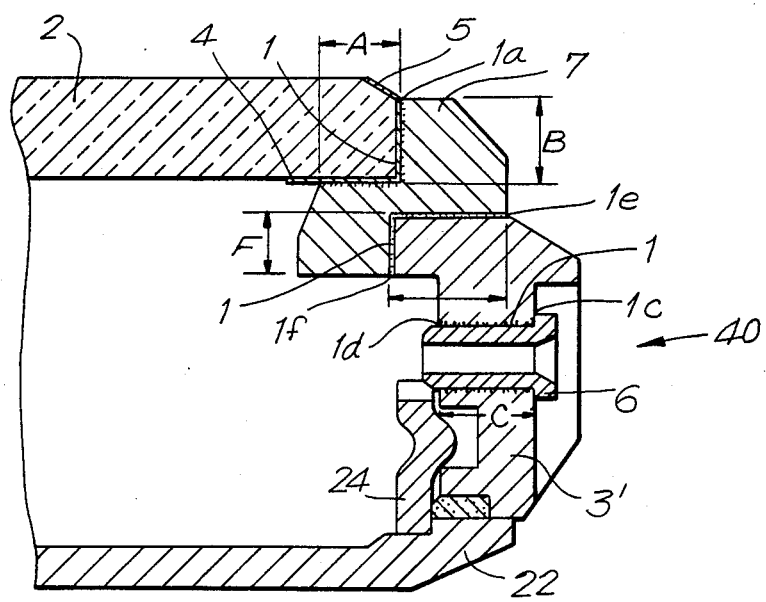
FIG. 4 is a sectional view of a second embodiment of a watch case constructed and arranged in accordance with the invention.

A second embodiment of a timepiece case 40 constructed in accordance with the invention is shown generally in FIG. 4. The structure of timepiece case 40 is essentially similar to case 30 in FIG. 3, except that a conventional glass bezel 7 is interposed between a case band 3' and glass 2. Bonding agent 1 is applied to the surfaces between glass 2 and glass bezel 7 and between bezel 7 and case band 3'. As with the previous embodiment, bonding agent 1 is applied to the region between pipe 6 and case band 3'.

Sufficient bonding agent 1 must be applied between glass bezel 7 and case band 3 to adhere these pieces securely. Measurement F represents the height of the region receiving bonding agent 1 between glass bezel 7 and case band 3'. Measurement E is the dimension in the planar or horizontal direction. The preferred dimension of E and F are, $E \geqq 0.4$ mm and $F/E \geqq 1$. In order to achieve proper adhesive force and sealing, the preferred dimensions of A and B are as described for the embodiment of FIG. 3. Position 1a and 1e indicate the exposed portions of bonding agent 1 in the region between glass bezel 7 and case band 3. When these portions of bonding agent 1 are irradiated, air is sealed from the interior portions of bonding agent 1 to cure the bonding agent due to the anaerobic properties of bonding agent 1.

Figure 5:
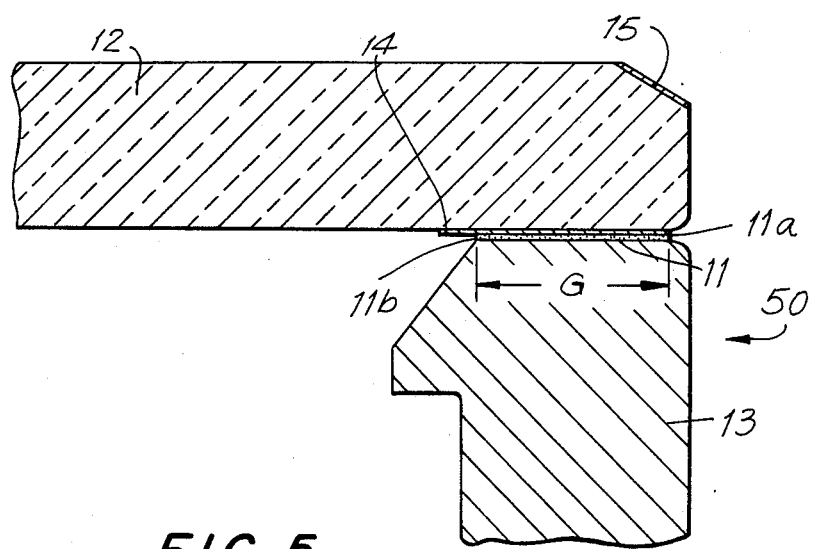
FIG. 5 is a sectional view of a third embodiment of a watch case constructed and arranged in accordance with the invention.

A third embodiment of a timepiece case 50 constructed in accordance with the invention is illustrated in sectional view in FIG. 5. In this embodiment, a case band 13 is formed without any bearing wall for supporting a watch glass 12 and a bonding agent 11 is applied only in the planar direction. Glass 12 is mounted on the upper horizontal surface of a case band 13. By using bonding agent 11 in accordance with the invention the synthetic resin gasket and the stress created thereby is eliminated. Because there is no need to exert pressure to keep a gasket secured, there is no need for a bearing wall. Therefore, a waterproof timepiece case constructed with bonding agent 11 is simplified and can have a greater variety of configurations.

This embodiment must have sufficient intermediate bonding agent to be practical. Dimension G is the top width of case back 13 and, preferably $G \geqq 0.8$ mm. When G is less than 0.8 mm, the amount of adhesive is too small to hold glass 12 in place. This embodiment is similar to the embodiments of FIGS. 3 and 4 in that the anaerobicity of bonding agent 11 at edges 11a and 11b seals the interior which then is cured. A band or coating 14 having a width greater than the width of G is applied to glass 12 as in FIG. 3 to mask bonding agent 11. An outside metalizing coating 15 can also be applied for similar purposes.

Figure 6:
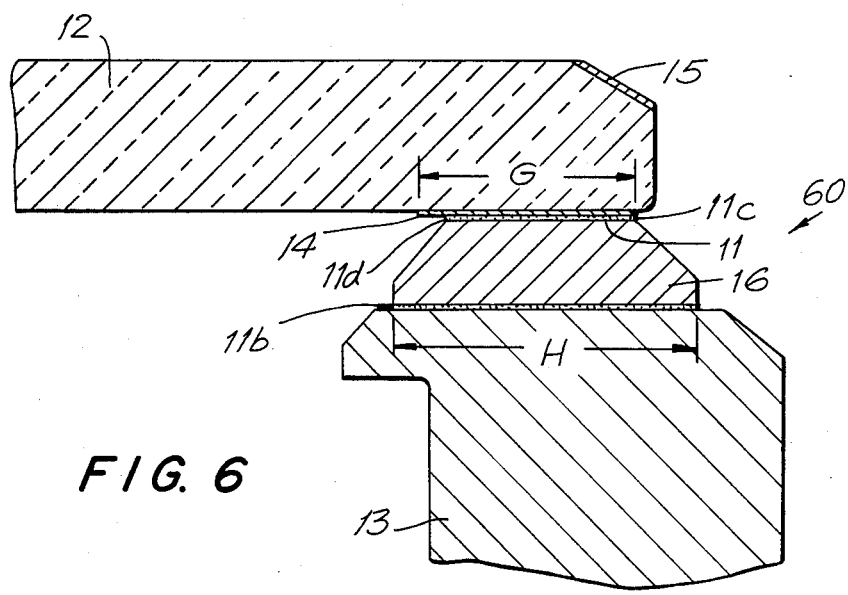
FIG. 6 is a sectional view of a fourth embodiment of a watch case constructed and arranged in accordance with the invention.

A timepiece case 60 similar to case 50 illustrated in FIG. 5, but with the addition of a glass bezel 16 having a trapezodial cross-section between opposed surfaces of glass plate 12 and case band 13 is illustrated in sectional view in FIG. 6. Bezel 16 does not include a bearing wall. Bonding between glass 12 and bezel 16 is along a dimension G and similar to the bonding between glass 12 and case band 13 in FIG. 5. The coating of bonding agent 11 applied between glass bezel 16 and case band 13 along a dimension H. The widths of G and H should be equal to or more than about 0.8 mm to ensure secure adhesion. If H is less than 0.8 mm, the adhesive dimension is too small to hold bezel 16 in place. As in the earlier described embodiments, the anaerobicity of bonding agent 11 at edges 11c and 11d in the joining area between glass 12 and bezel 11 cause the entire bonding agent 11 to cure. The remaining portions of case 60 not shown are similar to the earlier embodiments.

Figure 7:
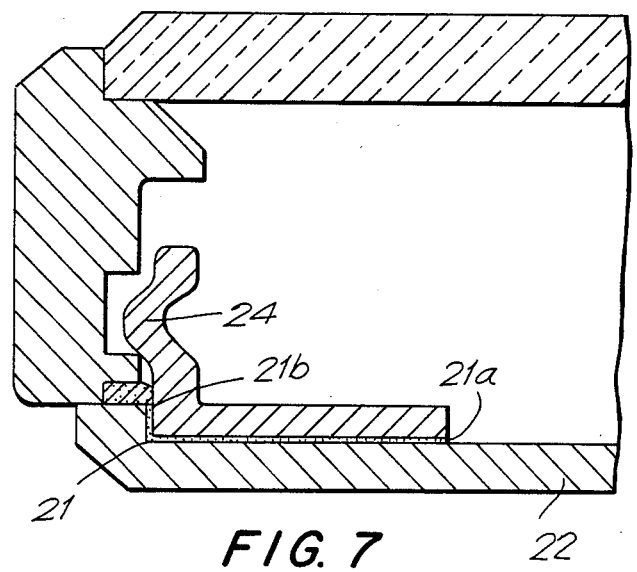
FIG. 7 is a sectional view of a fifth embodiment of a watch case constructed and arranged in accordance with the invention.

FIG. 7 illustrates a further embodiment wherein core or clip 24 is bonded to case back 22 with bonding agent 21. Light will set bonding agent 21 at points 21b and 21a. When the bonding agent is set, air is sealed from the remaining portion of bonding agent 21 which then cures due to its anaerobic properties.

Figure 8:
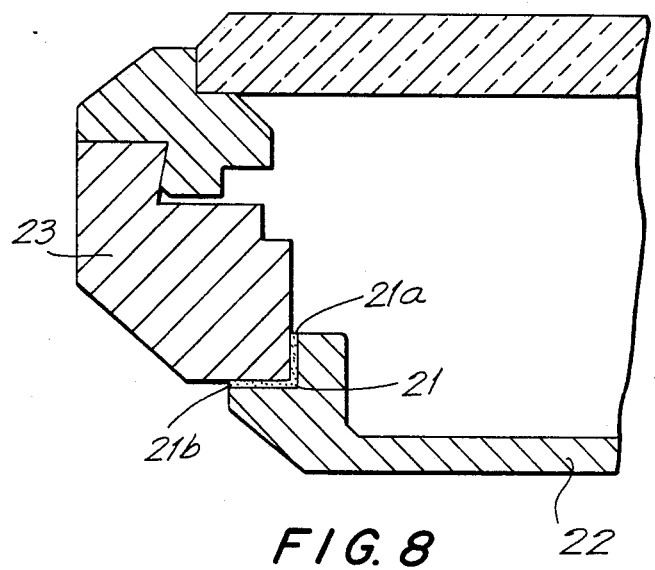
FIG. 8 is a sectional view of a sixth embodiment of a watch case constructed and arranged in accordance with the invention.

FIG. 8 illustrates the use of bonding agent 21 to bond case back 22 to a case band 23. Because light can pass through glass 2, and because light can pass through the case back or case band if they are transparent or semi-transparent, even internal portions of the case including decorative members and the like can be bonded with the bonding agent. Assembly of a watch case in accordance with this embodiment is suitable when case band 23 and case back 22 are made from different materials or have different finishes or different treatments.

EXAMPLE 1

As noted earlier, the bonding agent must contain proper ratios of components A to F. If the amount of a component varies too greatly, water resistance deteriorates as well as the setting properties. Accordingly, three samples of the bonding agent were prepared in accordance with the invention for purposes of illustration only, and not in a limiting source. Four comparison samples were prepared having compositions outside the desired ranges. The compositions of these seven samples are listed in Table 1. As illustrated in Table 1, when proper ratios are not present, the viscosity, adhesive force, water resistance, set up characteristics or price are not as suitable.

light irradiation, it is suitable to be fixed. This will provide a waterproof seal between the two parts, including between the case band and a decorative member and the like.

When the decorative material is transparent or semi-transparent joining is possible by irradiation, even if the seal is not exposed to the exterior, such as inside of the case. It is also possible to use the bonding agent in accordance with the invention in a non-waterproof construction. The bonding agent can be used to join a portion of the glass to the watch case.

EXAMPLE 2

The waterproof properties of watch case constructed in accordance with the invention using bonding agent were tested. The following data relating to water resistance was obtained.
1. Water resistance under static pressure: water resistance is OK under pressure of 3 atmospheres
2. Dynamic water resistance: water resistance is OK after a fall of one meter onto an oak plate

TABLE 1

| ITEM | sample 1 | sample 2 | sample 3 | comparison example 1 | comparison example 2 | comparison example 3 | comparison example 4 |
|---|---|---|---|---|---|---|---|
| ratio of components | | | | | | | |
| (A) urethane (meta) acrylate | 100 | 100 | 100 | 100 | | | |
| (A) urethane acrylate | | | | | 100 | 100 | 100 |
| (B) 2-hydroxypropyl acrylate | 30 | 100 | 200 | 20 | 20 | 220 | 250 |
| (C) isobornyl (meta) acrylate | 30 | 100 | | 20 | | | |
| (C) isobornyl acrylate | | | 200 | | 20 | 220 | 250 |
| (D) rosin ester | 30 | 100 | 200 | 20 | 20 | 220 | 250 |
| (E) acrylic acid | 5 | 30 | | 2 | 3 | | |
| (E) methacrylic acid | | | 50 | | | 60 | 100 |
| (F) benzoin | 0.5 | 10 | 15 | 0.1 | | | |
| (F) benzylmethylketal | | | | | 0.3 | 0.7 | 20 |
| properties | | | | | | | |
| (1) viscosity | O | O | O | X | X | X | X |
| (2) adhesive force | O | O | O | X | X | O | O |
| (3) water resistance | O | O | O | X | X | X | X |
| (4) setup characteristics | O | O | O | X | X | O | O |
| (5) price | O | O | O | O | O | O | X |

The results summarized in Table 1 show that Samples 1 to 3 in accordance with the invention have superior properties compared to Comparative Samples 1-4. In the experiments on which the results are reported, the properties were observed at the time of joining the outer peripheral of a watch glass and a test case band. The evaluation was as follows.

Acceptable viscosity indicates that the bonding agent was able to be applied properly through an application needle. An acceptable adhesive force between the glass and the case band was 40 kg. Water resistance was evaluated by a waterproof test under a pressure of 3 atmospheres as defined in JIS-B 7021. The setup characteristics were evaluated in accordance with the degree of stiffening of the bonding agent with time. Acceptable price was assessed in view of the high cost of benzyldimethylketal.

In each embodiment of the invention, bonding and waterproofing occurs between the glass and the case band, the glass and the bezel, the glass bezel and the case band, and the case band and the pipe. However, so long as a portion of the bonding agent can be exposed to 3. Long-term water resistance: water resistance is OK after immersion in water with a temperature of 20° C. for more than 100 hours
4. Durable water resistance: water resistance is OK after the weather-resistance test (fademeter for 200 hours) and the water resistance is OK after the heat resistance test ($-20°$ C. to 60° C. three times). Bonding agent having a composition of Sample 3 in Table 1 was applied to the seams between the glass and the case band. Waterproof packing was used to seal the seam between the case back and case band. Thirty comparison cases were constructed and sealed with ultraviolet setting, one liquid bonding agent (UV 3013B) made by Three Bond Co., Ltd. Both sets of test samples were evaluated, and the average water resistance results are reported below and summarized in Table 2. The test samples sealed with the bonding agent prepared in accordance with the invention outperformed the samples sealed with conventional bonding materials in the following categories: deterioration of adhesive force, dynamic water resistance, long term water resistance and weather resistance against water and heat.

TABLE 2

| | A deterioration of the adhesive force | B initial water resistance | C dynamic water resistance | D log-term water resistance | E water resistance against weather/heat resistance |
|---|---|---|---|---|---|
| example using the | about 8 hours | O | X | 20 H | X |

TABLE 2-continued

|   | A<br>deterioration of the<br>adhesive force | B<br>initial water<br>resistance | C<br>dynamic water<br>resistance | D<br>log-term water<br>resistance | E<br>water resistance against<br>weather/heat resistance |
|---|---|---|---|---|---|
| conventional UV bonding agent | | | | | |
| example using the bonding agent of present invention | about 1000 hours | O | O | more than 100 H | O |

O = acceptable
X = unsatisfactory

The effect of hot water immersion on the adhesive force of the bonding agent was evaluated. The samples were immersed in hot water for various periods of time and then their adhesive force was evaluated. As illustrated in FIG. 9, the bonding agent of the invention could withstand immersion in 40° C. water about 100 times as long as conventional UV bonding agent and still maintain 10 kg of adhesive force.

Water resistance was evaluated similar to the method in JIS-B 7021. Water resistance was based on the ability of a bonding agent structure to prevent a haze of moisture from forming on the inside surface of the watch glass. Both the conventional bonding agent and the bonding agent of the invention exhibited acceptable initial water resistance at pressures up to 3 atmospheres.

Dynamic water resistance was evaluated by allowing both samples to fall one meter to an oak plate. Haze did not form in the sample sealed with the bonding agent in accordance with the invention. However, a haze formed on the glass using the conventional bonding materials.

Long term water resistance was evaluated by immersing both samples in 20° C. water until a haze formed. The sample sealed with conventional bonding agent developed a haze within 20 hours. (A haze did not form after 100 hours in the sample sealed with the bonding agent in accordance with the invention.

Resistance to the elements was tested. Both sets of samples were placed in a fademeter for 200 hours. The sample sealed with the conventional bonding agent developed a haze on the glass. No haze formed in the samples sealed with the bonding agent in accordance with the invention. Water resistance was further evaluated after the samples were subjected to heat changes. The temperature of the samples were increased from −20° C. to 60° C. three times and then the samples were immersed in water. Once again, in only the samples sealed with the bonding agent in accordance with the haze avoided.

Accordingly, watches and timepiece cases constructed using a bonding agent in accordance with the invention wherein certain case components are bonded to each other by the urethane (meta) acrylate bonding agent exhibit qualities superior to conventional bonding structures in many areas. Extremely high water resistance is obtained compared to conventional structures. In view the design and external appearance, it is possible to construct a thin and miniaturized watch case by using smaller case parts for the glass, case band and glass bezel.

The construction in accordance with the invention eliminate the synthetic resin gasket. Thus, an increase number of watch designs is available. Many different size gaskets for every shape of case band are no longer needed. The bonding agent prepared in accordance with the invention may be used on all types of watch cases, even if the outer shape of the glass differs. This allows a reduction in numbers of parts and a reduction in cost. Since the bonding agent is a one-liquid stiffening type and sets anaerobically, assembly is simplified. This makes it easy to replace the glass after sale. The bonding agent is then merely exposed to light from a normal fluorescent tube and the edge will set to promote the setting of the interior of the agent at normal conditions.

The bonding agent is also suitable for non-waterproof timepieces. A portion of the opposed surfaces between the glass and case can be sealed with bonding agent. The improved bonding agent will also allow an increased number of designs as where the glass extends beyond the outside of the case band as shown in FIG. 5. It will also permit use of a right glass having a rectangular planar shape which is not possible when mounting the glass using a resin gasket. In sum, the bonding agent prepared in accordance with the invention open a new era for the dress watch. It allows a wide variety of design effects, increase quality and at a reduction in cost because of its wide applicability and suitability for mass production.

It will thus be seen that the objects set forth above, among those made apparent from the preceding description, are efficiently attained and, since certain changes may be made in carrying out the above method and in the composition set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A bonding structure for timepiece case components, wherein a bonding agent comprises on a weight basis;
    (A) based on about 100 parts of a urethane (meta) acrylate having at least one of an acryloyl group and methacryloyl group per molecule;
    (B) 30 to 200 parts of at least one (meta) acrylate having more than one hydroxyl group per molecule;
    (C) 30 to 200 parts isobornyl acrylate;
    (D) 30 to 200 parts of at least one pre-tacky resin which is soluble in (meta) acrylate monomer, selected from the group consisting of petroleum series, coal series rosin ester series, and mixtures thereof;

(E) 5 to 50 parts of at least one acid selected from the group consisting of acrylic acid and methacrylic acid and mixtures thereof; and (F) 0.5 to 15 parts of a photopolymerization initiator.

2. The bonding agent of claim 1, wherein the photopolymerization initiator is one of benzoin and benzyldimethylketal.

3. The bonding agent of claim 1, wherein the (meta) acrylate having more than one hydroxyl group per molecule is 2-hydroxypropyl (meta) acrylate.

4. The bonding agent of claim 1, wherein the (meta) acrylate having more than one hydroxyl group per molecule is 2-hydroxypropyl acrylate, the isobornyl acrylate is isobornyl (meta) acrylate, the pre-tacky resin is rosin ester, the acid is acrylic acid and the polymerization initiator is benzoin.

5. The bonding agent of claim 1, wherein the (meta) acrylate having more than one hydroxyl group per molecule is 2-hydroxypropyl acrylate, the isobornyl acrylate is isobornyl acrylate, the pre-tacky resin is rosin ester, the acid is methacrylic acid and the polymerization initiator is benzoin.

6. A timepiece case comprising, a case band having at least one opening for viewing a time means positioned in the case band, a transparent plate mounted on the at least one opening by a bonding agent, comprising on a weight basis:

(A) based on about 100 parts of a urethane (meta) acrylate having at least one of a acryloyl group and methacryloyl group per molecule;

(B) 30 to 200 parts (meta) acrylate having more than one hydroxyl group per molecule;

(C) 30 to 200 parts isobornyl acrylate;

(D) 30 to 200 parts of at least one pre-tacky resin which is soluble in (meta) acrylate monomer selected from the group consisting of petroleum series, coal series rosin ester series, and mixtures thereof;

(E) 5 to 50 parts of at least one acid selected from the group consisting of acrylic acid and methacrylic acid and mixtures thereof; and (F) 0.5 to 15 parts of a photopolymerization initiator.

7. The timepiece case of claim 6, wherein the case band is formed with an opening for receiving a stem pipe, the stem pipe bonded to the case band by the bonding agent.

8. The timepiece of claim 6, wherein the timepiece case includes a case back and is formed with a case back opening opposite the opening for viewing, the case back opening for selectively receiving the case back.

9. The timepiece of claim 8, wherein the case back is formed from a substantially planar portion and a projecting clip portion, the clip portion extending into the interior of the case band for selectively engaging the case band, the clip portion bonded to the case back with the bonding agent.

10. The timepiece case of claim 6, further including a plate bezel bonded to the viewing side of the case band, the plate bonded to the bezel with the bonding agent.

11. The timepiece case of claim 10, wherein the plate bezel is formed with a shoulder having a planar surface and a plate bearing surface for receiving the plate and the bonding agent disposed between the planar and bearing surfaces and the edge of the plate.

* * * * *